(12) United States Patent
Ozaki et al.

(10) Patent No.: US 7,383,554 B2
(45) Date of Patent: Jun. 3, 2008

(54) INFORMATION PROCESSING APPARATUS, INFORMATION PROCESSING METHOD, AND CONTROL PROGRAM

(75) Inventors: Hiroshi Ozaki, Kanagawa (JP); Kouichi Sugiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 727 days.

(21) Appl. No.: 10/459,502

(22) Filed: Jun. 12, 2003

(65) Prior Publication Data

US 2003/0233488 A1 Dec. 18, 2003

(30) Foreign Application Priority Data

Jun. 13, 2002 (JP) .............................. 2002-172783

(51) Int. Cl.
G06F 13/10 (2006.01)
G06F 3/12 (2006.01)
G06F 9/445 (2006.01)

(52) U.S. Cl. ...................... 719/327; 719/321; 358/1.1; 717/176

(58) Field of Classification Search ................ 719/321, 719/327; 358/1.1; 717/176
See application file for complete search history.

(56) References Cited

U.S. PATENT DOCUMENTS

| | | | |
|---|---|---|---|
| 6,184,998 B1 * | 2/2001 | Tebeka ........................ | 358/1.15 |
| 6,424,424 B1 * | 7/2002 | Lomas et al. ................ | 358/1.14 |
| 6,847,466 B1 * | 1/2005 | Gazdik et al. .............. | 358/1.15 |
| 6,915,514 B1 | 7/2005 | Machida ...................... | 717/174 |
| 6,989,910 B2 * | 1/2006 | Lomas et al. ................ | 358/1.15 |
| 7,143,150 B1 * | 11/2006 | Nuggehalli .................. | 709/221 |
| 2002/0035941 A1 * | 3/2002 | Nakao ........................ | 101/484 |
| 2003/0046674 A1 * | 3/2003 | Gentry et al. ................ | 717/171 |
| 2003/0120624 A1 * | 6/2003 | Poppenga et al. ............ | 707/1 |
| 2003/0184784 A1 * | 10/2003 | Ferlitsch .................... | 358/1.13 |
| 2003/0231328 A1 * | 12/2003 | Chapin et al. .............. | 358/1.13 |
| 2005/0210464 A1 | 9/2005 | Machida ...................... | 717/174 |

FOREIGN PATENT DOCUMENTS

| | | |
|---|---|---|
| EP | 1 178 393 A2 | 2/2002 |
| GB | 2 351 374 A | 12/2000 |
| JP | 2000-215128 | 8/2000 |
| JP | 2000-330742 | 11/2000 |
| JP | 2000-353079 | 12/2000 |
| JP | 2001-117834 | 4/2001 |
| JP | 2002-014820 | 1/2002 |
| JP | 2002-149363 | 5/2002 |

OTHER PUBLICATIONS

English translation of JP 2002-149363.

\* cited by examiner

*Primary Examiner*—Li B Zhen
(74) *Attorney, Agent, or Firm*—Fitzpatrick, Cella, Harper & Scinto

(57) ABSTRACT

The following method and an apparatus, a medium, and the like to which the method can be applied are disclosed as examples of embodiments. In an information processing method in an information processing apparatus which can communicate with an image forming apparatus, the method has a recognizing step of recognizing that a driver program for an image forming process is installed into the information processing apparatus, an obtaining step of obtaining construction information which is used for setting of the driver program from an outside, an activating step of activating the obtaining step in response to the recognition of the installation of the driver program by the recognizing step, and a setting step of setting the construction information obtained by the obtaining step so that it can be read by the driver program.

19 Claims, 16 Drawing Sheets

SERVER APPARATUS

CLIENT APPARATUS

INFORMATION PROCESSING APPARATUS, INFORMATION PROCESSING METHOD, AND CONTROL PROGRAM

BACKGROUND OF THE INVENTION

1. Field of the Invention

The invention relates to a peripheral apparatus, an information processing apparatus for communicating with the peripheral apparatus, a network system including those apparatuses, a control program for controlling them, and a control method.

2. Related Background Art

As a conventional installing method of a printer driver, there is a technique for interactively realizing a printer driver installing operation such that on a setting display screen of a printer, addition of the printer is selected, thereafter, necessary information is input in an interactive manner (called a wizard) with the user, and the printer driver is installed.

Further, on a server, a mechanism of distributing the printer driver from a server apparatus to a client apparatus by installing it by "Point & Print" using a print server is being developed.

There are also being developed utilities comprising a program for obtaining main body information such as IP address, apparatus type name, and the like of the printer and information of an option as a function which can be expanded to a printing apparatus by using MIB (Management Information Base: refer to RFC1442 or the like) of SNMP (Simple Network Management Protocol) as a well-known network management protocol or a status obtaining function of a printing protocol which has been developed by various companies.

However, in the case of the conventional installing method as mentioned above, like an enterprise user constructing a print system of a relatively large scale, if the enterprise user owns a number of computers and has a number of clients, there are various problems because it is necessary to execute the operation for allowing all of the clients to install the printer driver. For example, it is necessary that the user confirms which printer he can use, the IP address of the printer, set information of a port, an apparatus type of the printer, option(s) which the printer supports, and the like, further, downloads and installs the printer driver matched with the printer from a server or a vendor site, and makes environment setting of an output port and the like. Knowledge and ability for such tiresome setting are required for each user. There are also problems such that it is tiring to execute such an operation and a large number of steps are required for education and creation of an instruction manual for teaching them. There is also a problem such that if each user freely installs various drivers and disorderly connects them to the printers, a trouble sometimes occurs in the print system. There is also a problem such that, on the contrary, if a printer administrator (IT manager) visits each user in order to install the driver, when there are a number of clients, it takes a very long time.

Further, in recent years, in order to cope with expansion of the functions of the printing apparatus, a hard disk, an expansion RAM, a variety of many sorting apparatuses, and paper feed cassettes can be attached as options. It is necessary that construction information of the printer is correctly reflected to the setting of the printer driver after the printer driver was installed. However, many drivers cannot be judged only by appearances. Special knowledge of the apparatus is necessary. It is difficult to correctly make the driver setting.

SUMMARY OF THE INVENTION

The invention is made to solve at least one of the above problems and it is an object of the invention to provide a mechanism for realizing a method whereby each user can easily install a driver of an available printer into his own client apparatus without needing any special knowledge.

To accomplish the above object, for example, an information processing apparatus according to the invention has the following construction.

According to the first invention, there is provided an information processing apparatus which can communicate with an image forming apparatus, comprising: recognizing means for recognizing that a driver program for an image forming process is installed into the information processing apparatus; obtaining means for obtaining construction information which is used for setting of the driver program from an outside; activating means for activating the obtaining means in response to the recognition of the installation of the driver program by the recognizing means; and setting means for setting the construction information obtained by the obtaining means so that it can be read by the driver program.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

First Embodiment

Figure 1:
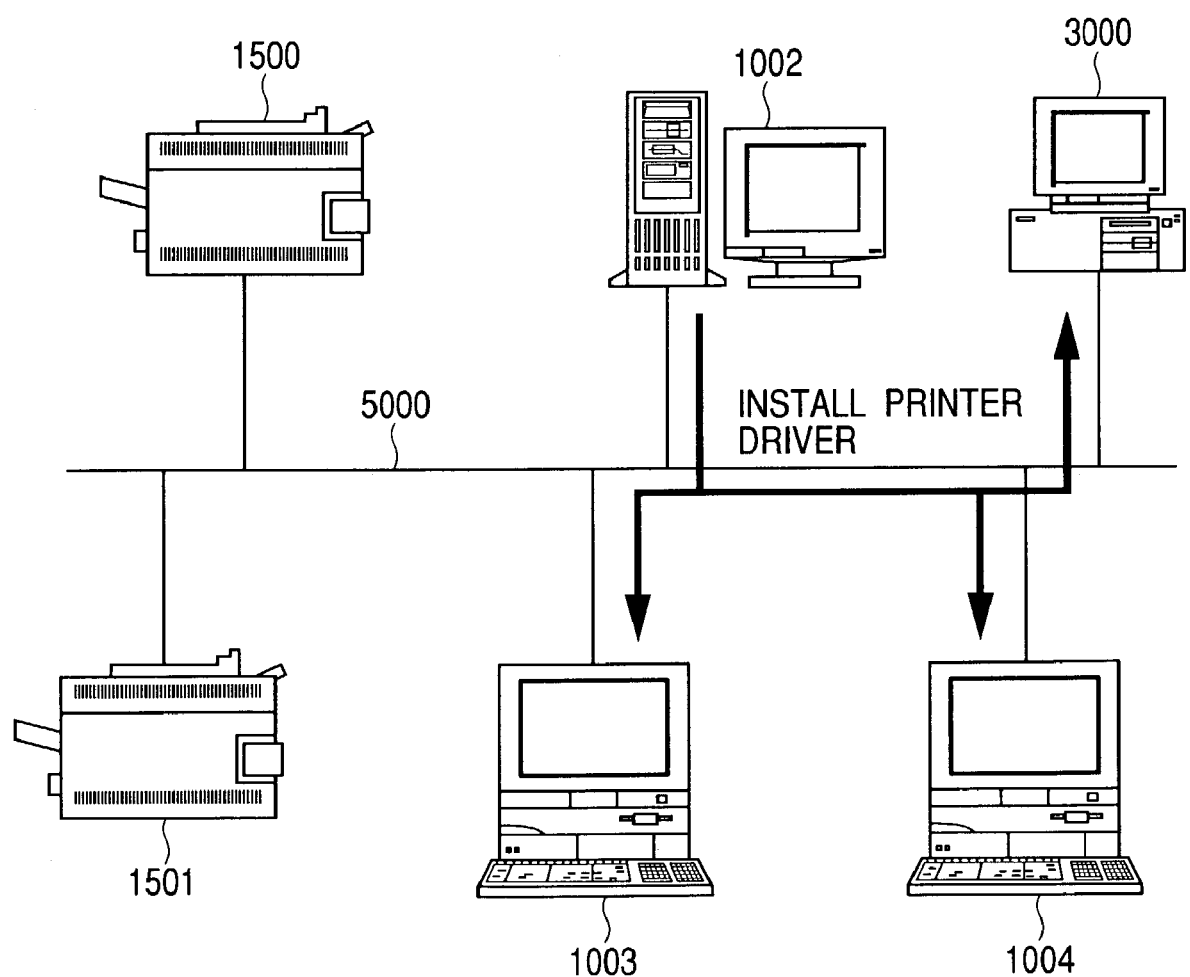
FIG. 1 is a diagram showing a constructional example of a print processing system according to an embodiment of the invention.

An example of an embodiment suitable for applying the invention will be described hereinbelow with reference to the drawings. FIG. 1 is a diagram showing an example of a print system of the invention. A server apparatus 1002, a plurality of client apparatuses 1003 and 1004, a client apparatus 3000 as a preferred example of an information processing apparatus of the invention, and printers 1500 and 1501 as preferred examples of image forming apparatuses are connected onto a network. A printer driver can be installed from the server apparatus 1002 to the client apparatuses. Although not shown, a scanner, a digital camera, a facsimile apparatus, a mouse, a speaker, a sound source apparatus, a telephone, a copying apparatus, and the like are connected onto the network. Each client apparatus has a similar function. As examples of the image forming apparatuses serving as peripheral apparatuses, there are a printer, a copying apparatus, a facsimile apparatus, a scanner, a digital camera, and the like.

Figure 2:
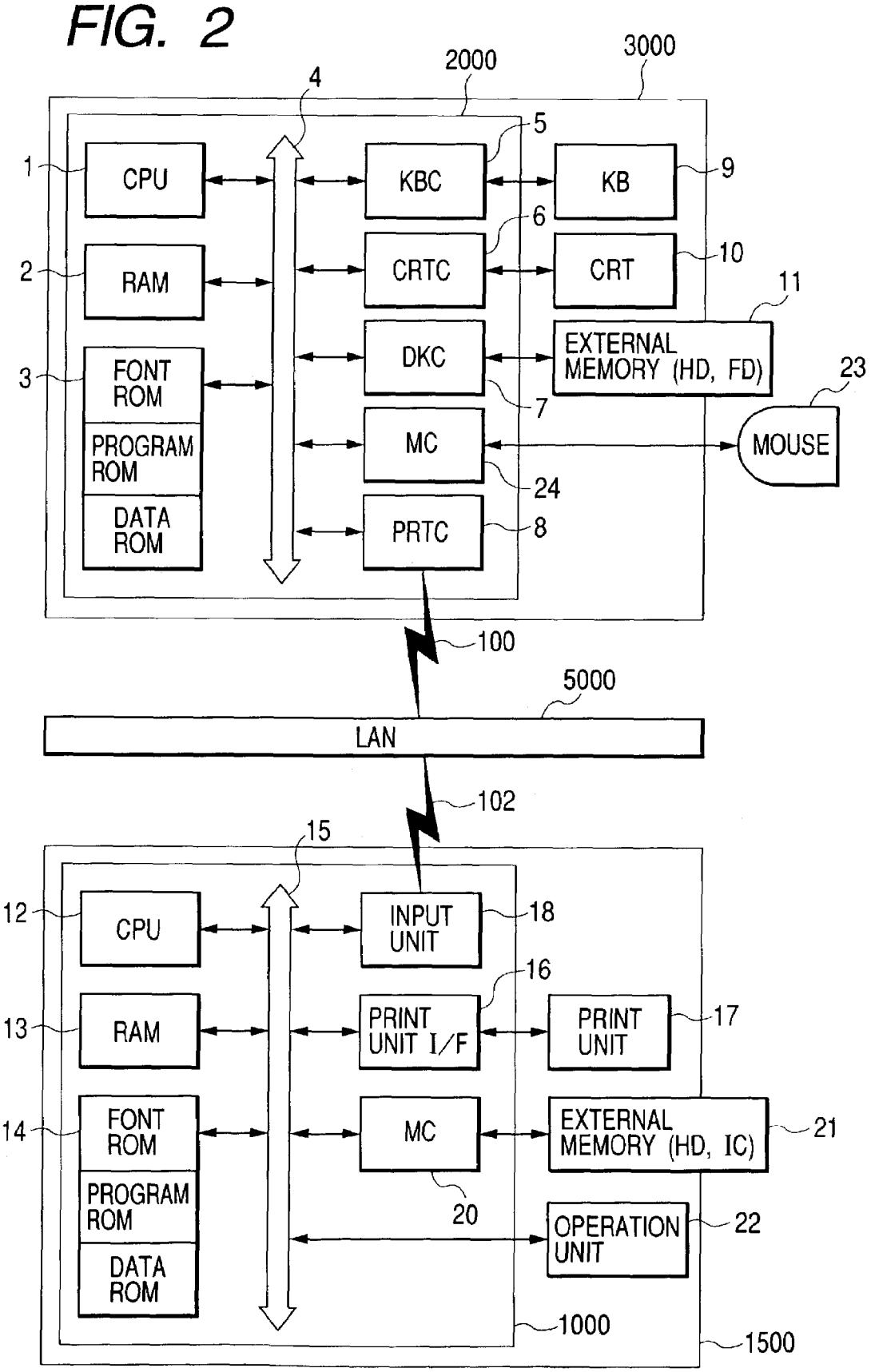
FIG. 2 is a diagram showing an example of internal constructions of apparatuses constructing the print processing system shown in FIG. 1.

FIG. 2 is a diagram showing an example of internal constructions of the apparatuses constructing the print processing system shown in FIG. 1. Naturally, as a form of connecting the client apparatus 3000 and the printer 1500, any form such as LAN, WAN, public line, Internet, or the like can be applied unless otherwise specified. In FIG. 2, reference numeral 3000 denotes the host computer having a CPU 1 for executing processes of a document in which a figure, an image, characters, a table (including a spreadsheet), and the like exist mixedly on the basis of a document processing program or the like stored in a program ROM in a ROM 3 or an external memory 11. The CPU 1 integratedly controls each device connected to a system bus 4.

An operating system program (hereinafter, referred to as an OS) serving as a control program of the CPU 1 and the like are stored in the program ROM in the ROM 3 or the external memory 11. Font data and the like which are used upon execution of the document processes or the like are stored in a font ROM in the ROM 3 or the external memory 11. Various data that is used upon execution of the document processes or the like is stored in a data ROM in the ROM 3 or the external memory 11. Reference numeral 2 denotes a RAM which functions as a main memory, a work area, or the like of the CPU 1. Reference numeral 5 denotes a keyboard controller (KBC) for controlling a key input from a keyboard 9 or a pointing device (not shown).

Reference numeral 6 denotes a CRT controller (CRTC) for controlling a display of a CRT display (CRT) 10. Reference numeral 7 denotes disk controller (DKC) for controlling an access to the external memory 11 such as hard disk (HD), floppy (registered trademark) disk (FD), or the like for storing a boot program, various applications, font data, user files, edit files, a printer control command forming program (hereinafter, referred to as a printer driver), and the like.

Reference numeral 8 denotes a printer controller (PRTC), which is connected to the printer 1500 via a network 100 and execute a bidirectional communication control process for controlling bidirectional communication with the printer 1500. There is a case where upon transmission, a command according to a connected protocol is added to a print job. There is also a case where the OS automatically adds the command. The CPU 1 executes, for example, a developing (rasterizing) process of an outline font into a display information RAM set onto the RAM 2, thereby enabling "WYSIWYG" on the CRT 10.

The CPU 1 opens various registered windows on the basis of commands instructed by a mouse cursor or the like (not shown) on the CRT 10 and executes various data processes. When the user executes printing, he opens a window regarding the print setting and can make setting of a print processing method for the printer driver including the setting of the printer and selection of a print mode. A display of the mouse cursor on the CRT 10 is controlled via the CRTC 6 in accordance with an input via a mouse controller (MC) 24 based on the operation of a mouse 23.

In the printer 1500, reference numeral 12 denotes a printer CPU. On the basis of a control program or the like stored in a program ROM in a ROM 14 or a control program or the like stored in an external memory 21, the printer CPU 12 outputs an image signal as output information to a print unit (printer engine) 17 via a print unit I/F 16 connected to a system bus 15.

The control program of the CPU 12 and the like are stored in the program ROM in the ROM 14. Font data and the like which are used upon creation of the output information are stored in a font ROM in the ROM 14. In the case of a printer without the external memory 21 such as a hard disk or the like, information and the like which are used on the client apparatus 3000 (host computer) have been stored in a data ROM in the ROM 14. The CPU 12 can execute a communication process for controlling communication with the host computer via an input unit 18. The CPU 12 can notify the host computer 3000 of information or the like in the printer. Data received from the printer driver is stored in a RAM 13 and converted into an image signal by the control program. Interpretation of commands added in accordance with a communicating protocol is also made by the control program.

The RAM 13 functions as a main memory, a work area, or the like of the CPU 12. A memory capacity of the RAM 13 can be expanded by an option RAM which is connected to an expanding port (not shown). The RAM 13 is used as an output information developing area, an environment data storing area, an NVRAM, or the like.

An access of the foregoing external memory 21 such as hard disk (HD), IC card, or the like which is considered as an example is controlled by a memory controller (MC) 20. The external memory 21 is connected as an option and stores font data, an emulation program, form data, and the like.

Reference numeral 22 denotes an operation panel on which switches for operation, an LED display, a liquid crystal panel, and the like are arranged. The number of external memories mentioned above is not limited to one but the system can be also constructed in a manner such that at least one or more memories are provided and, in addition to built-in fonts, option font cards and a plurality of external memories in which programs for interpreting printer control languages of different language systems have been stored can be connected. Further, it is also possible that the system has an NVRAM (not shown) and printer mode set information from the operation panel 22 is stored.

Figure 3A:
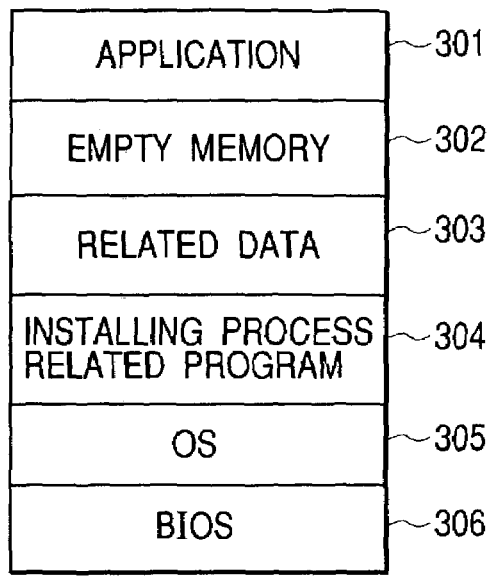
FIGS. 3A and 3B are diagrams showing examples of memory maps in a state where control programs have been loaded into RAMs of a client apparatus and a server apparatus and can be executed.
Figure 3B:
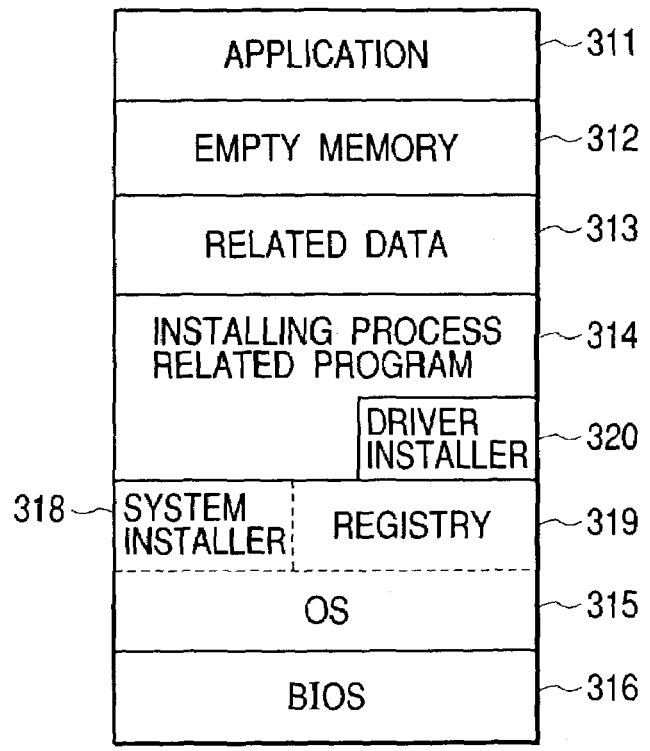

FIGS. 3A and 3B are diagrams showing examples of memory maps in a state where the control programs have been loaded into the RAMs of the client apparatus and the server apparatus and can be executed. FIG. 3B shows the memory map in the state where the control program in the embodiment has been loaded into the RAM 2 on the client apparatus 3000 and can be executed. As will be explained in detail hereinlater, the server apparatus 1002 has a hardware construction similar to that of the client apparatus 3000 in FIG. 1 and the memory map is as shown in FIG. 3A.

An application 311 has been stored in the client apparatus. An installing process related program 314 has also been stored in the client apparatus. A driver installer 320 is included in the installing process related program. Reference numeral 315 denotes an operating system (OS). This OS includes a system installer 318 and a registry 319. Upon installing, the system installer installs a driver program stored in a predetermined area into the system in accordance with an API call from the driver installer 320.

In the embodiment, a system in which setting of printers which can be used in each client apparatus and a preparation of the printer driver are preliminarily made in the print server, the installation is made in response to a request from the client user as a trigger, and subsequently, environment setting is automatically made is referred to as a pull-type printer driver installing system hereinbelow. In the embodiment, an explanation will be made hereinbelow with respect to the pull-type installing system.

When the pull-type printer driver installation is made, on the server side, by constructing the apparatus in a manner such that construction information of the printer is obtained and this information is referred to when the printer driver is installed on the client apparatus side, thereby enabling initial setting of the printer driver to be made, there is no need to provide a program for obtaining the construction information of the printer to the client side. Thus, a size of printer driver which is transmitted from the server to the client can be minimized. By obtaining the construction information on the server side, there is no need to transmit it from each client. Therefore, reduction of traffic of the network can be realized. Consequently, both of the client user and the IT manager can install the printer driver into the client apparatus by the minimum number of processing steps and the minimum load on the network.

Figure 4:
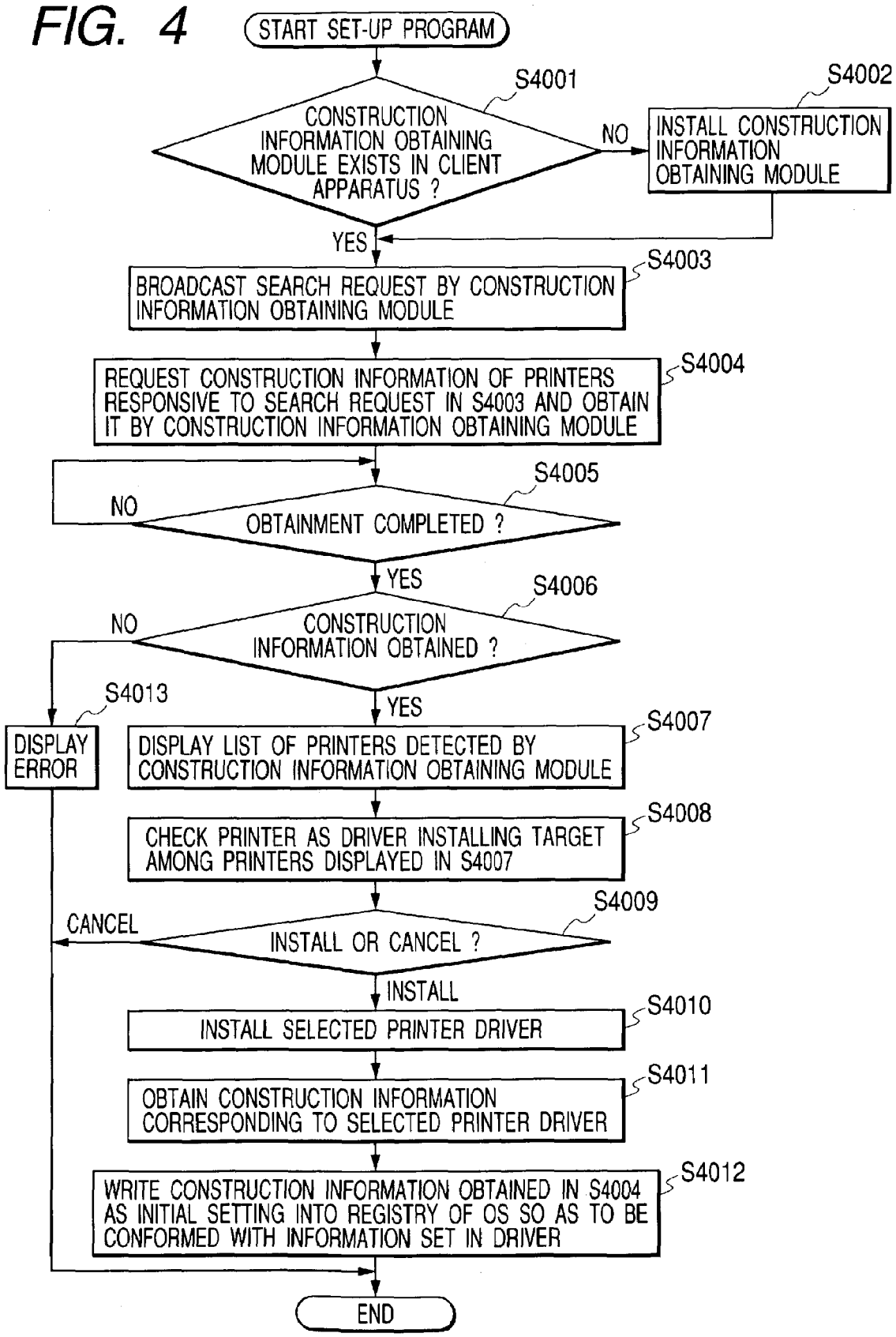
FIG. 4 is a flowchart showing an example of processes in automatic installation by a printer driver installer.
Figure 13:
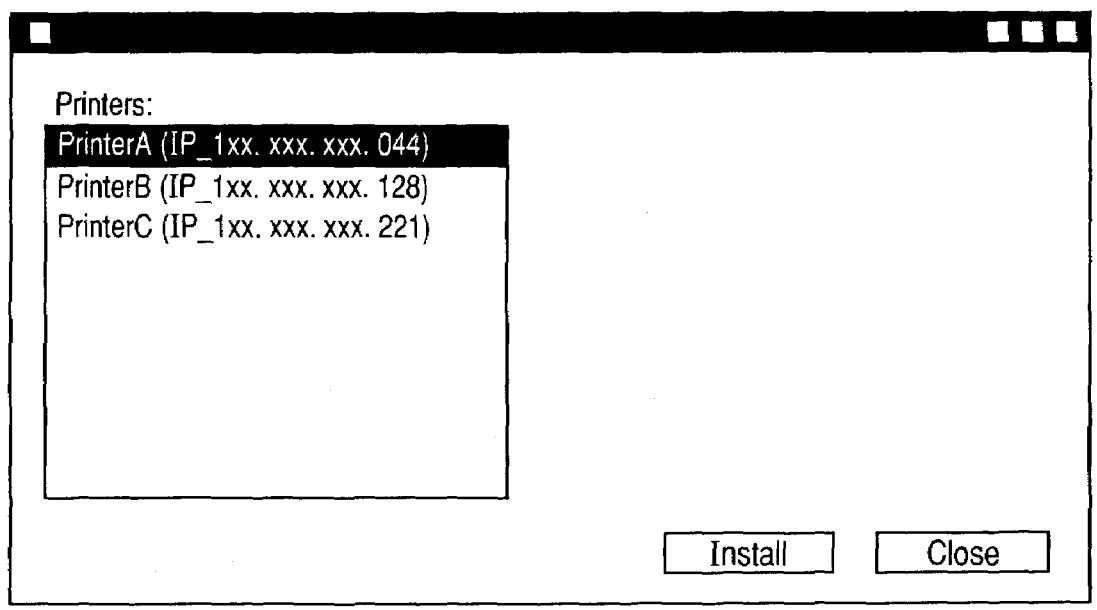
FIG. 13 is a diagram showing an example of a UI display screen for allowing the client user to select a printer as an installation target.

FIG. 4 is a flowchart showing an example of processes in automatic installation by a printer driver installer. When the driver installer is activated on the client apparatus 3000 side by the user, the processes in FIG. 4 are started. In step S4001, in response to the activation of the driver installer, the driver installer discriminates whether a construction information obtaining module exists in the client apparatus or not. If it is determined in S4001 that the construction information obtaining module does not exist in the client apparatus, the driver installer obtains the construction information obtaining module (S4002) and S4003 follows. If the driver installer determines in S4001 that the construction information obtaining module has already existed in the client apparatus, the processing routine advances directly to S4003. In S4003, the construction information obtaining module broadcasts a search request in response to the call from the activated driver installer. In S4004, the construction information obtaining module recognizes the printers which responded to the search request in S4003, requests the construction information of the printers which responded to the search request, and obtains it. In S4005, the apparatus enters an obtainment completion waiting state of the construction information from the printers responsive to the obtaining request for a preset time. In S4005, even if no construction information can be obtained, if the preset time elapses and a time-out occurs, it is regarded that the obtainment of the construction information has been completed. The processing routine advances to S4006. In S4006, the driver installer discriminates whether the construction information obtaining module could actually obtain the construction information from the printers or not. If it is determined in S4006 that the construction information obtaining module cannot be obtained, S4013 follows and an error is displayed. The processing routine is finished. If the driver installer determined in S4006 that the construction information obtaining module could obtain the construction information, S4007 follows. In S4007, the driver installer displays a list of the printers which were searched and detected by the construction information obtaining module. FIG. 13 is a diagram showing an example of a UI display screen for allowing the client user to select the printer as an installation target. For example, such a list can be displayed on a display screen of a printer list as shown in FIG. 13 by the driver installer and the construction information obtaining module.

For example, the user selects a desired printer from the printers displayed on the printer list of FIG. 13. In S4008, on the basis of information input by the user, the driver installer specifies the printer serving as a target of driver installation from the printers displayed in S4007. In S4009, the driver installer discriminates whether the user has clicked an install button showing an input of an instruction to urge the installation or not or whether the user has clicked a cancel button showing an input of an instruction to stop the installation or not. If it is determined in S4009 that the cancel button has been clicked, the driver installer stops the installing process and finishes the process. If it is determined in S4009 that the install button has been clicked, S4010 follows and the driver specified in S4008 is installed. In S4011, in response to the recognition of the click of the install button showing the input of the instruction to install the driver, the driver installer (recognizing means) obtains the construction information corresponding to the selected printer driver from the construction information which has been obtained in, for example, an MIB format or a predetermined printing protocol format by the construction information obtaining module and stored in the installing server. In S4012, on the basis of the construction information obtained in S4004, the driver installer writes the information which is set into the driver into the registry of the OS as initial setting so as to obtain conformance. For example, if a printer A does not have an expanding deck for paper feed, as initial setting, values which can be selected as paper feed items of a driver UI are automatically set so that a value indicative of the expanding deck for paper feed cannot be selected from the paper feed items of the driver UI, or a UI in which the value for the expanding deck has been excluded from the values which can be selected can be also constructed.

Although the driver installer has recognized the installation of the driver on the basis of the instruction to install the driver, naturally, it is also possible, for example, to use a method whereby the installation of the driver is recognized by recognizing the storage of the driver into a predetermined storing area and the construction information obtaining module is activated in response to it.

As described above, when the driver installer as an example of the recognizing means of the invention recognizes the click of the install button showing the start of the installation of the driver and showing the instruction of the set-up of the driver, the driver installer automatically activates the construction information obtaining module in response to it. As for the values of the various set items which can be displayed in the driver UI, the driver installer conformably stores initial values so as to be matched with the function of the printer by using the construction information for the searched printer obtained by the construction information obtaining module.

Figure 15:
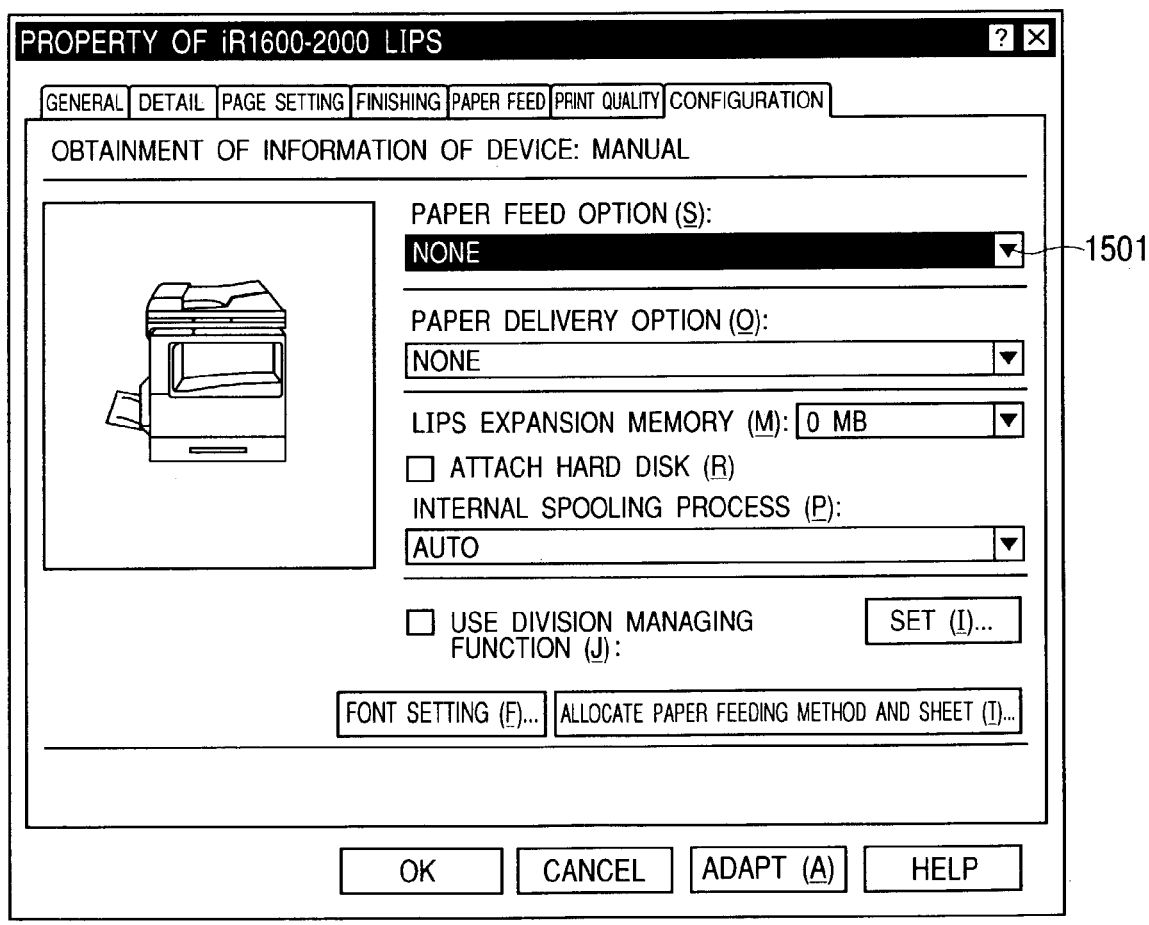
FIG. 15 is a diagram showing printer UI initial setting in the case where the printer driver has been installed without referring to a construction information file in the embodiment.
Figure 16:
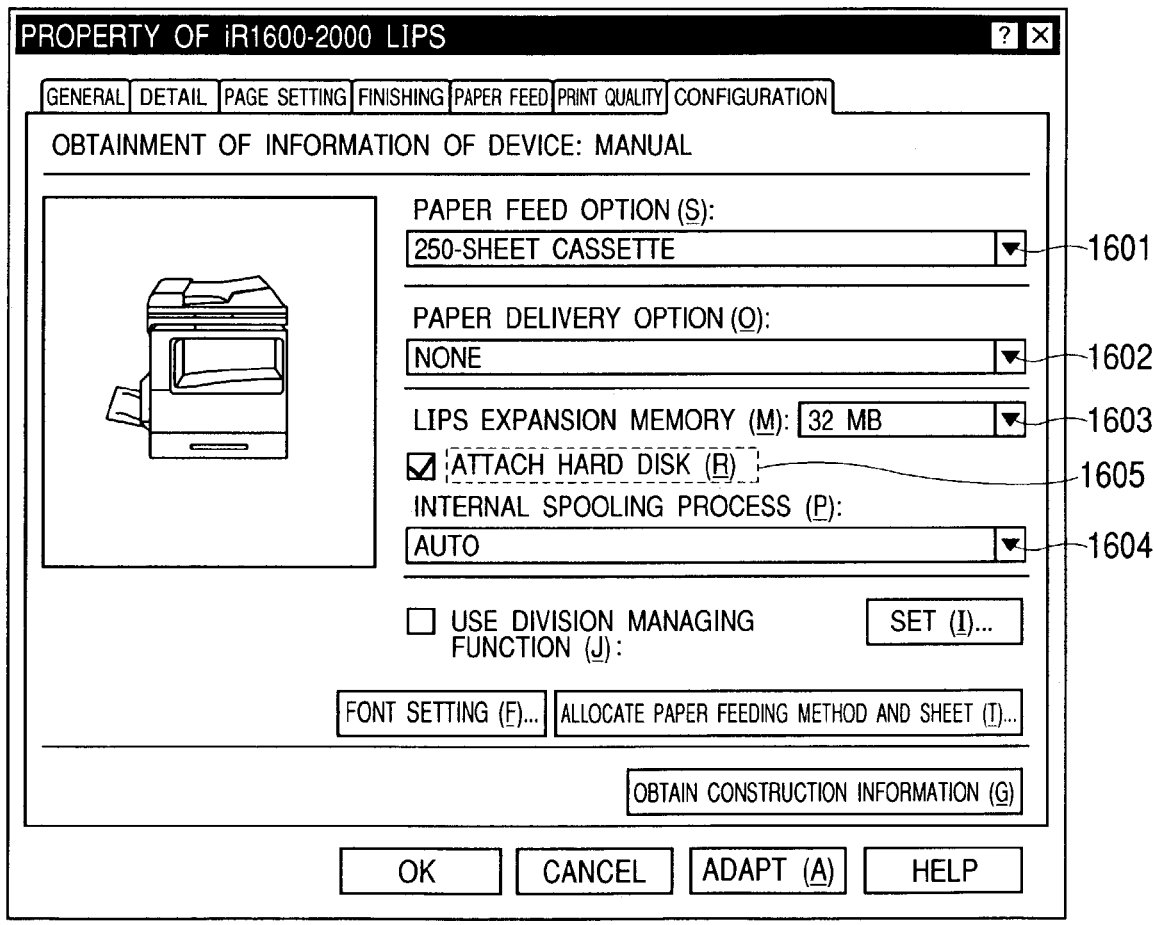
FIG. 16 is a diagram showing printer UI initial setting in the case where the printer driver has been installed with reference to the construction information file in the embodiment.

FIG. 15 shows an initial setting state of the printer driver UI in the case where there is no printer construction information. FIG. 16 shows an initial setting state of the printer driver UI in the case where the driver is installed in accordance with the printer construction information. Explanation will be made. If the driver installer does not have a construction such that the construction information is obtained and the driver setting is dynamically made, the device information is not obtained. Therefore, in spite of the fact that the printer A actually has the paper feed option, since no device information obtained, the initial value showing that the paper feed option is "none" is set and the printer driver UI is in the unconformable initial state. In FIG. 16, when the installation is instructed to the driver installer, the construction information obtaining module is automatically activated and the construction information of the printer A is obtained. In S4012, the obtained construction information is written into the registry in FIG. 5, which will be explained hereinlater.

Figure 5:
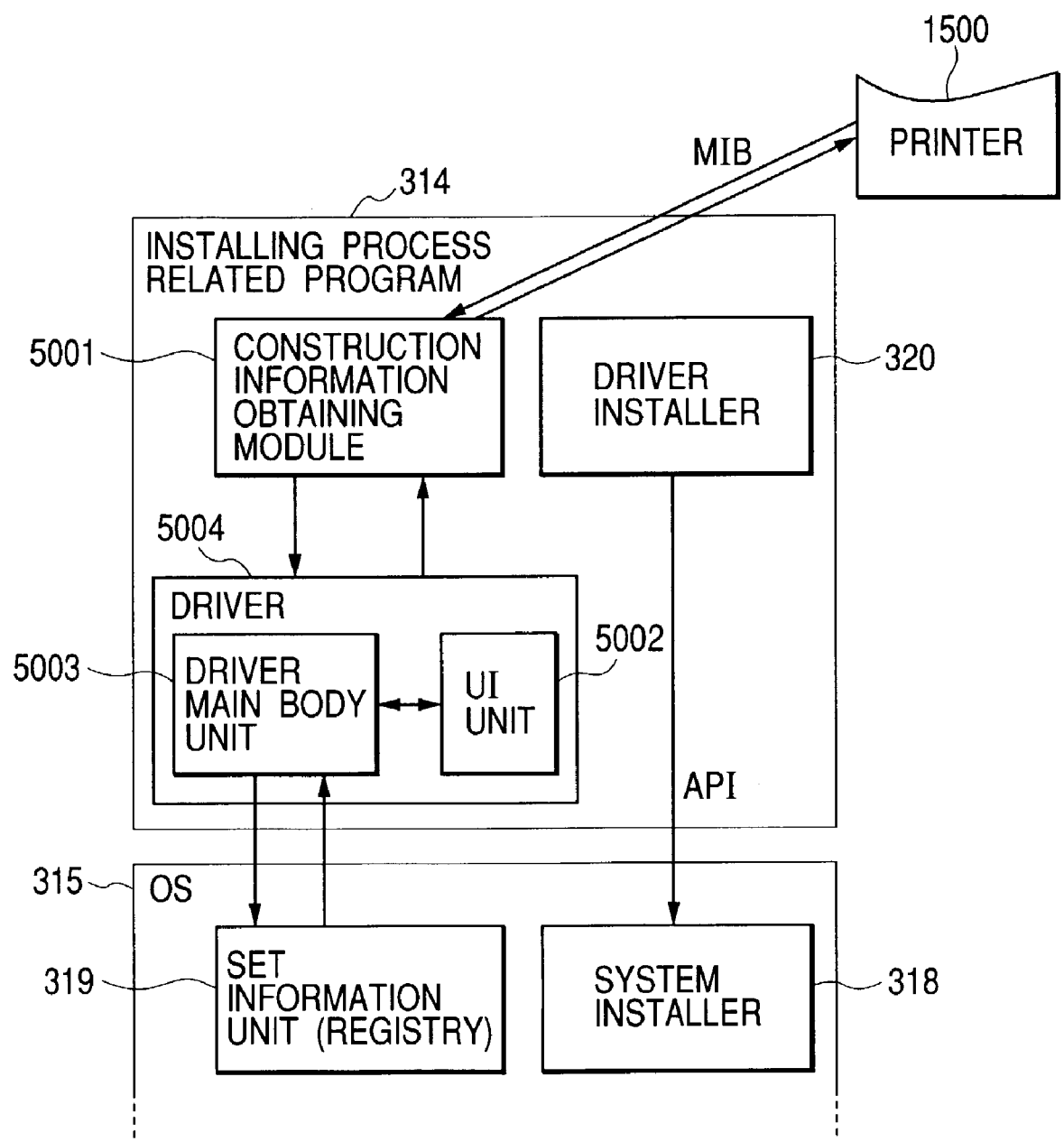
FIG. 5 is a diagram showing an example of details of an installation processing program and a registry shown in FIGS. 3A and 3B.

FIG. 5 is a block diagram showing an example of details of the installation processing program and registry shown in FIGS. 3A and 3B. As mentioned above, reference numeral 314 denotes the installing process related program. The program 314 is stored in the HD of the client apparatus 3000, loaded into the RAM 2, and executed. A construction information obtaining module (VDC) 5001, a driver main body unit 5003, and a UI unit 5002 included in the driver are included in the program 314. A module 320 included in the program 314 in FIG. 5 is a driver installer in a manner similar to that shown in FIG. 3B. When the input of the installing instruction is recognized, the driver installer calls the construction information obtaining module 5001, controls it via the API of the driver main body unit, and obtains the construction information of each peripheral apparatus as a driver installing target via the network. The driver main body unit stores the construction information obtained by a construction information obtaining module 5001 into a set information unit 319, for example, in a structure format of DEVMODE. By storing it in the DEVMODE format, when the UI unit of the driver is called, the display screen of FIG. 16 can be displayed. In this case, a value of the paper feed option "250-sheet cassette" 1601 is obtained by the construction information obtaining module 5001, for example, in an MIB format of SNMP. Subsequently, the driver installer converts the information in the MIB format into the DEVMODE format which can be read by the driver unit 5003, calls an API of the OS, and stores it into the set information unit 319. The UI unit controls so that the driver main body unit displays the value read out from the registry 319 into the paper feed option 1601.

The construction information obtaining module on the client side can manage, for example, the obtained information as a printer management table as shown below.

Information of the printer A in the printer management table:
IP: 1xx.xxx.xxx.044
Name: Printer-A
Construction information file: Printer-A.dat
(RAM: 32MB, 250-sheet cassette, HDD yes)

Therefore, as shown in FIG. 16, since information showing that the printer A has the paper feed option and, further, this paper feed option is the 250-sheet cassette can be obtained, for example, the user will understand that "250-sheet cassette" has automatically been set as an initial value of the set item of the paper feed option so as to be conformed with the function of the actual printer A. The construction information obtaining module can also obtain a paper delivery option, the number of expanding memories, and the like. In the pull-type installing system, the user can automatically and conformably set the values of the set items of the printer function of the driver UI in accordance with the printer function shown by the construction information of the actual printer merely by instructing the installation and selecting the driver. That is, the user is in the optimum setting state where when the installation of the driver is finished, the function of the option of the printer can be soon utilized by using the function of the driver. Conformable setting can be similarly made with respect to the RAM or HDD. The pull-installation of the driver into the client is made in a form such that the constructing state of the present printer has been reflected as mentioned above.

Second Embodiment

The pull-type installing program of the printer driver in the embodiment can also exist as a part of the installing process related program 304 (server apparatus) or 314 (client apparatus).

Figure 6:
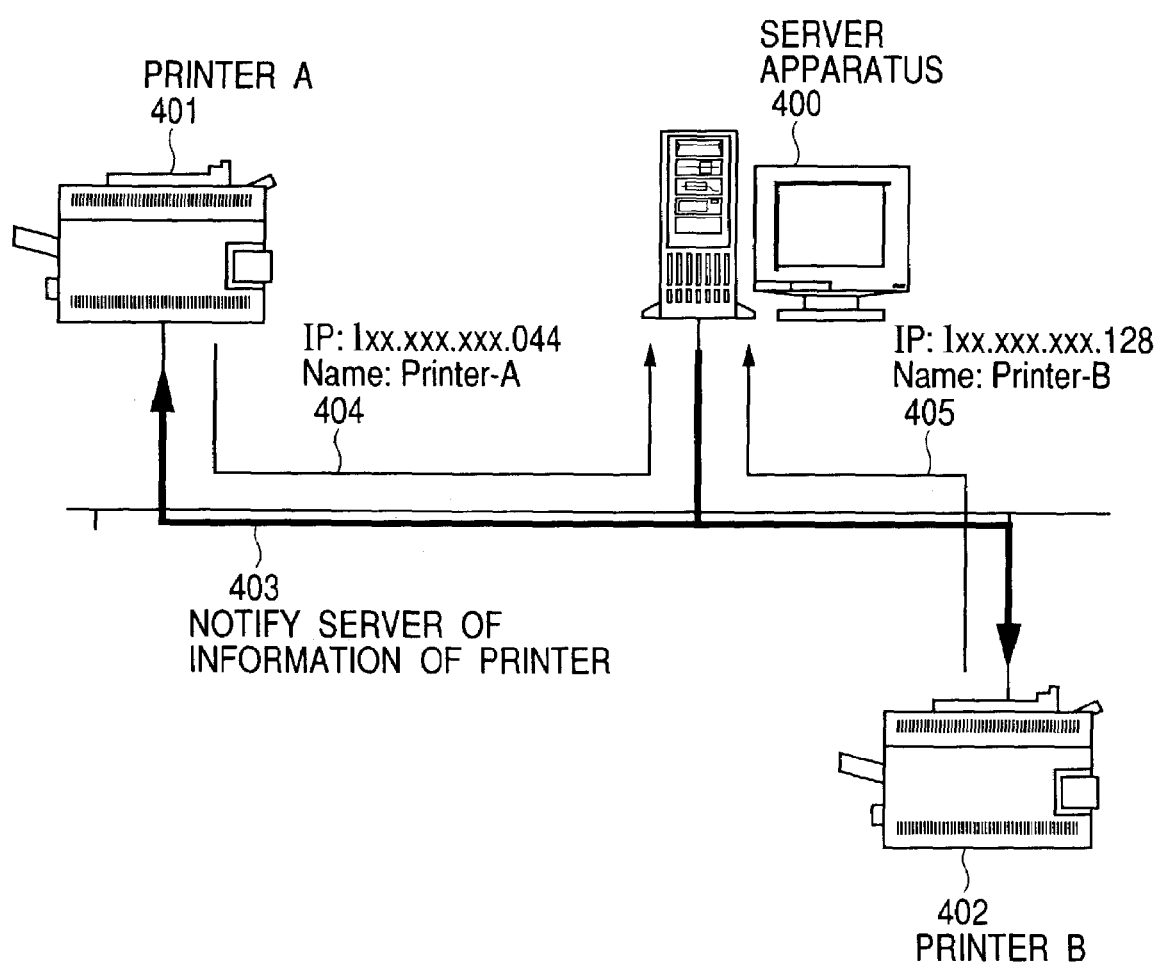
FIG. 6 is a diagram showing collection of printer construction information according to a printer management program in the embodiment.
Figure 7:
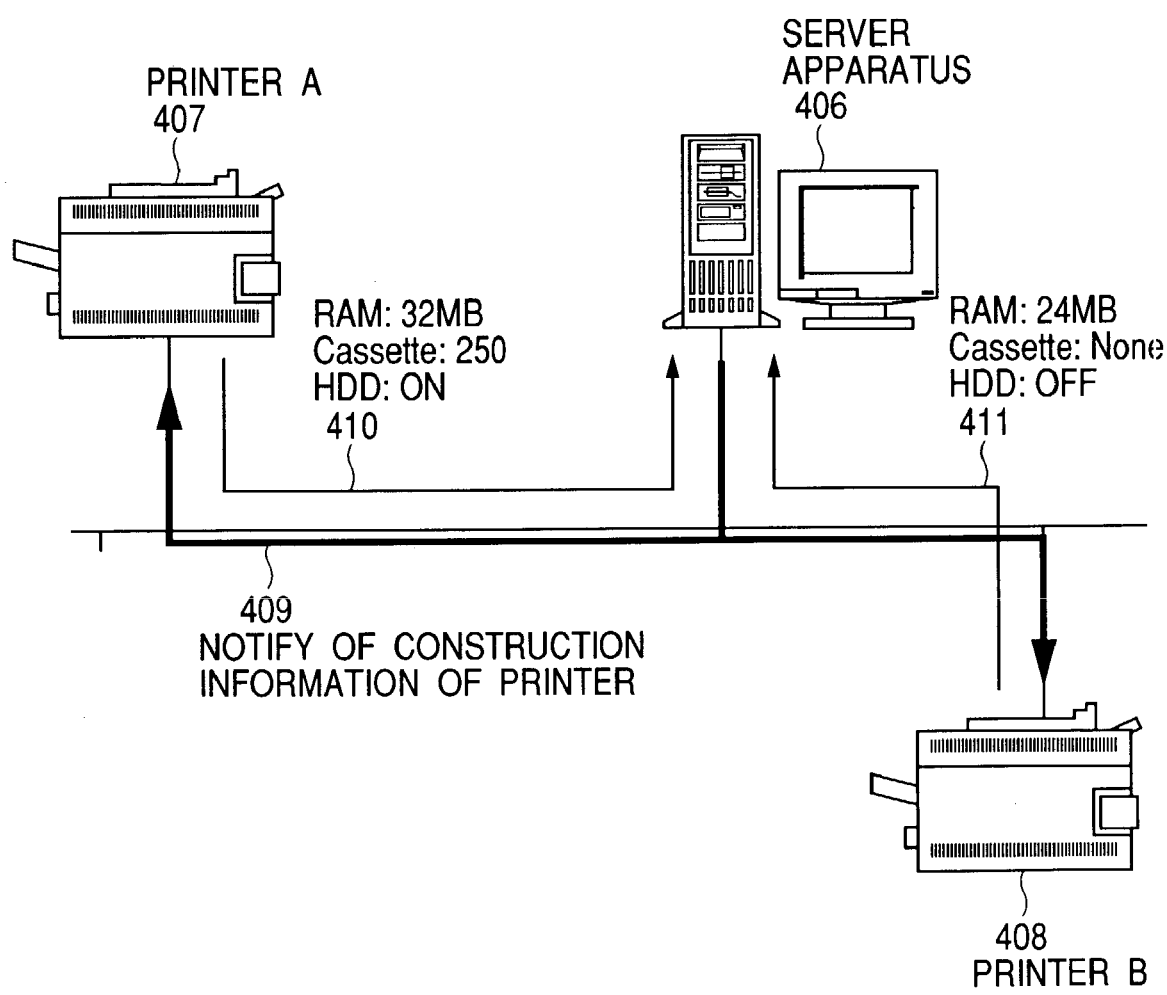
FIG. 7 is a diagram showing collection of client information according to a client management program in the embodiment.
Figure 8:
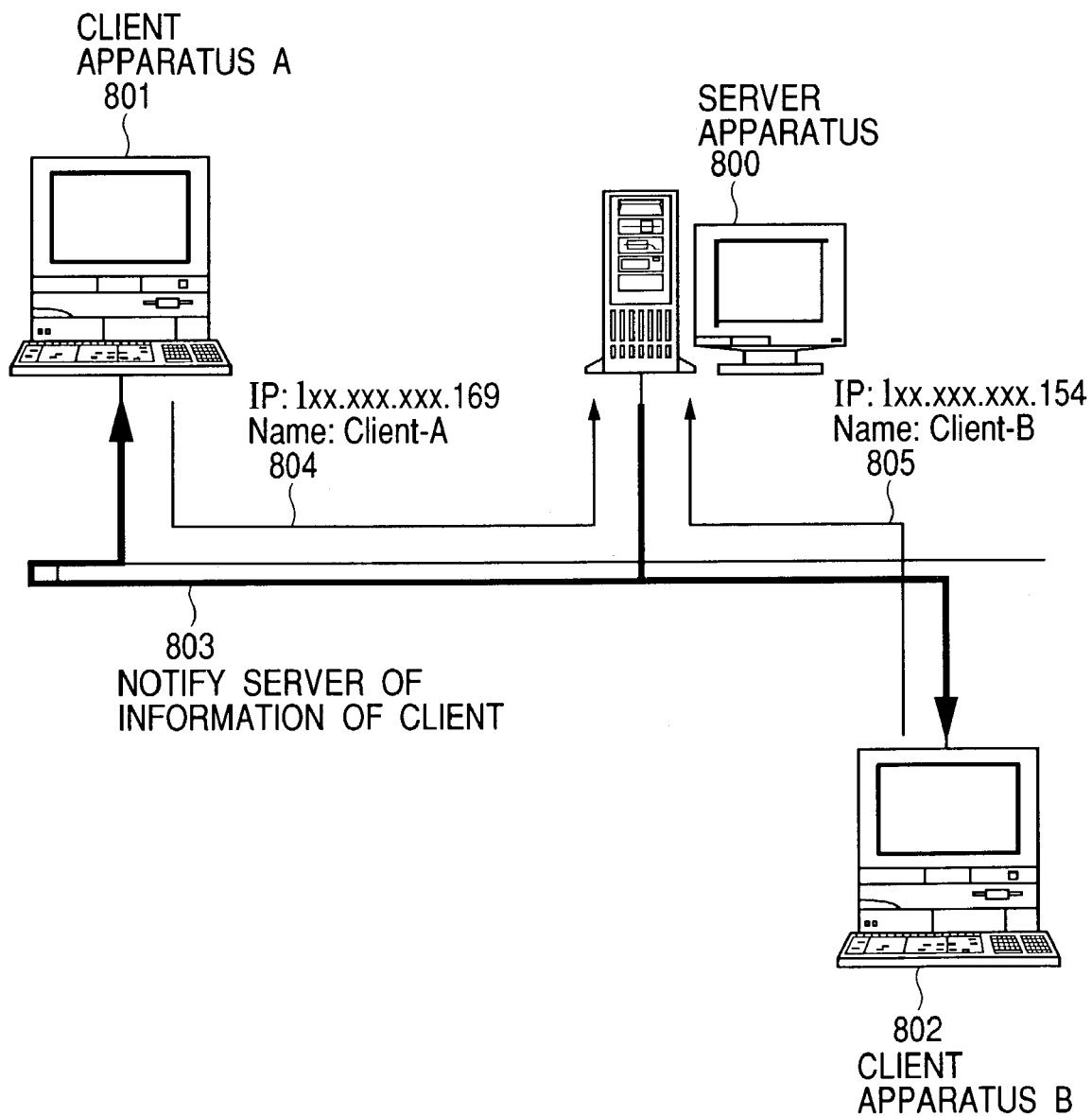
FIG. 8 is a conceptual diagram of a process for collecting the printer information and the client information in a server in the embodiment.

FIG. 6 is a diagram showing collection of the printer construction information according to a printer management program in the embodiment. Transmission and reception of the information between the server apparatus and the printer connected to the network are shown here. The printer management program has been installed in a server apparatus (400) corresponding to the server apparatus 1002 in FIG. 1. An instruction is issued to all printers connected to the network by this program so as to notify the server of the printer information (403). A printer 402 (corresponding to the printer 1500 in FIG. 1) which received such an instruction notifies the server of its own name and an IP address as shown in (405). The printers A, server apparatuses, and printers B shown in FIGS. 6, 7, and 8 are the corresponding same apparatuses, respectively. Naturally, each of the server apparatuses has the memory map of FIG. 3A and has the construction of the host computer 3000 in FIG. 1 and each of the printers has the construction of the printer 1500 in FIG. 1.

The printer management program on the server manages those information as printer information.
Information of the printer A
IP: 1xx.xxx.xxx.044
Name: Printer-A
Information of the printer B
IP: 1xx.xxx.xxx.128
Name: Printer-B FIG. 7 is a diagram showing collection of the client information according to a client management program in the embodiment. Further, as shown in FIG. 7, in order to obtain the construction information of the printers A and B, an instruction is issued to the printers whose IP addresses are IP: 1xx.xxx.xxx.044 and IP: 1xx.xxx.xxx.128 by the printer management program on a server (406) so as to notify the server of the construction information (409). In accordance with this instruction, the construction information of the printers is notified to the server (406) as shown in (410) and (411) and stored as construction information files. By the above control, according to the printer management program of the server 406, the following information is managed as set information based on the input of the printer management table.

Information of the printer A
IP: 1xx.xxx.xxx.044
Name: Printer-A
Construction information file: Printer-A.dat
(RAM: 32MB, 250-sheet cassette, HDD yes)
Information of the printer B
IP: 1xx.xxx.xxx.128
Name: Printer-B
Construction information file: Printer-B.dat
(RAM: 24MB, option cassette no, HDD no)

Although the construction information has been collected after the collection of the information such as IP, name, and the like in the embodiment, naturally, those information can be also simultaneously collected. As another construction information, there is information including a size of RAM mounted in the printing apparatus, a type of font, the presence or absence of attachment of a sorting apparatus, the presence or absence of a stapling function, or the presence or absence of attachment of an option paper feed cassette, or the like. Those information is also managed as set information mentioned above and can be used for setting at the time of the installation.

FIG. 8 shows transmission and reception of information between the server apparatus and the client apparatus connected to the network. The client management program has been installed in a server apparatus (800). An instruction is issued to all clients connected to the network by this program so as to notify the server of the client information (803). The client apparatus which received such an instruction notifies the server of its own name and an IP address as shown in (804) and (805). The client management program on the server manages those information as client information.

Figure 9:
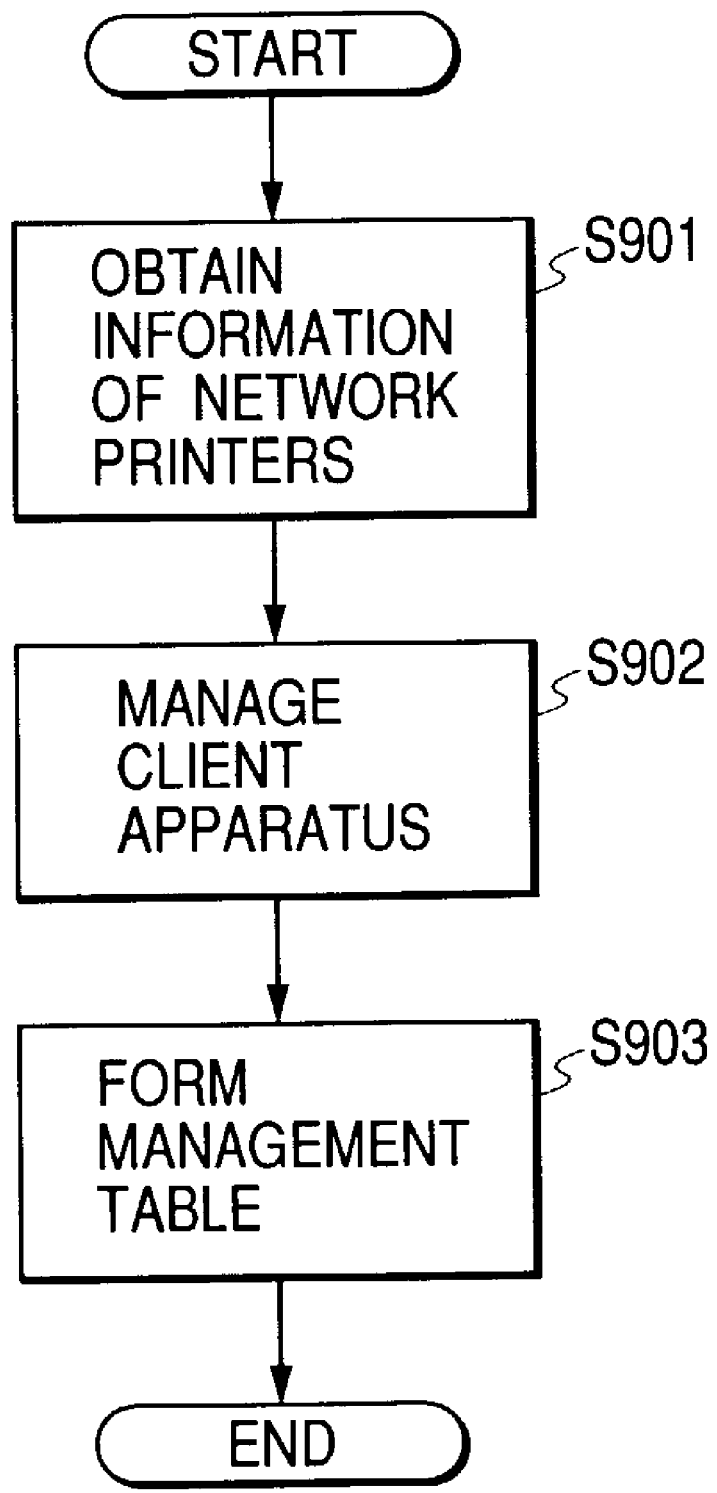
FIG. 9 is a flowchart showing a flow for control of the printer management program and the client management program on the server.
Figure 11:
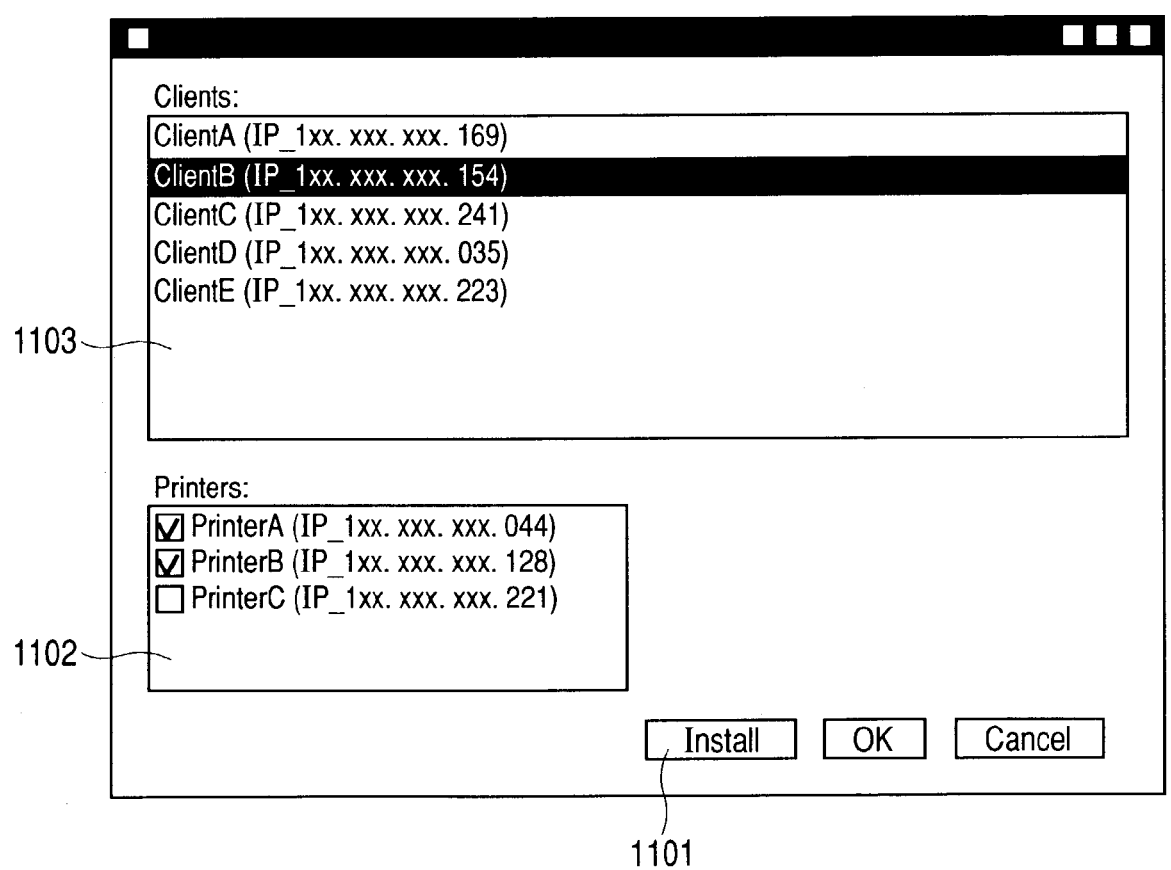
FIG. 11 is a diagram showing an example of a display screen on the server apparatus side for displaying clients which are managed by the server apparatus and printers which can be used by the clients.

Information of the client apparatus A
IP: 1xx.xxx.xxx.169
Name: Client-A
Information of the client apparatus B
IP: 1xx.xxx.xxx.154
Name: Client-B FIG. 9 is a flowchart showing a flow for control of the printer management program and the client management program on the server. The printer information is collected by the printer management program (S901). After that, the information of the client apparatuses is collected by the client management program and the printer information and the client information are managed on the server (S902). On the basis of those information, a management table is formed and displayed (S903). An example of the management table is shown in FIG. 11. FIG. 11 shows an example of a display screen on the server apparatus side for displaying clients which are managed by the server apparatus and printers which can be used by the clients.

By using the management table, the IT manager can instruct the printer management program and manage the printers which each client has been permitted to use. First, if there is an existing management table, its contents (that is, the present setting of each client) are read out and displayed here. When an arbitrary client is selected in Clients: column, the printers which the client has been permitted to use are displayed in a form with a check mark in a list of Printers: column. By changing the client in Clients: column, the user can see a state of each client.

Since nothing is allocated at the time of the first setting, to which client the installation of which printer is permitted is set from the initial setting state. A client serving as a management target can be also added on this UI.

Figure 12:
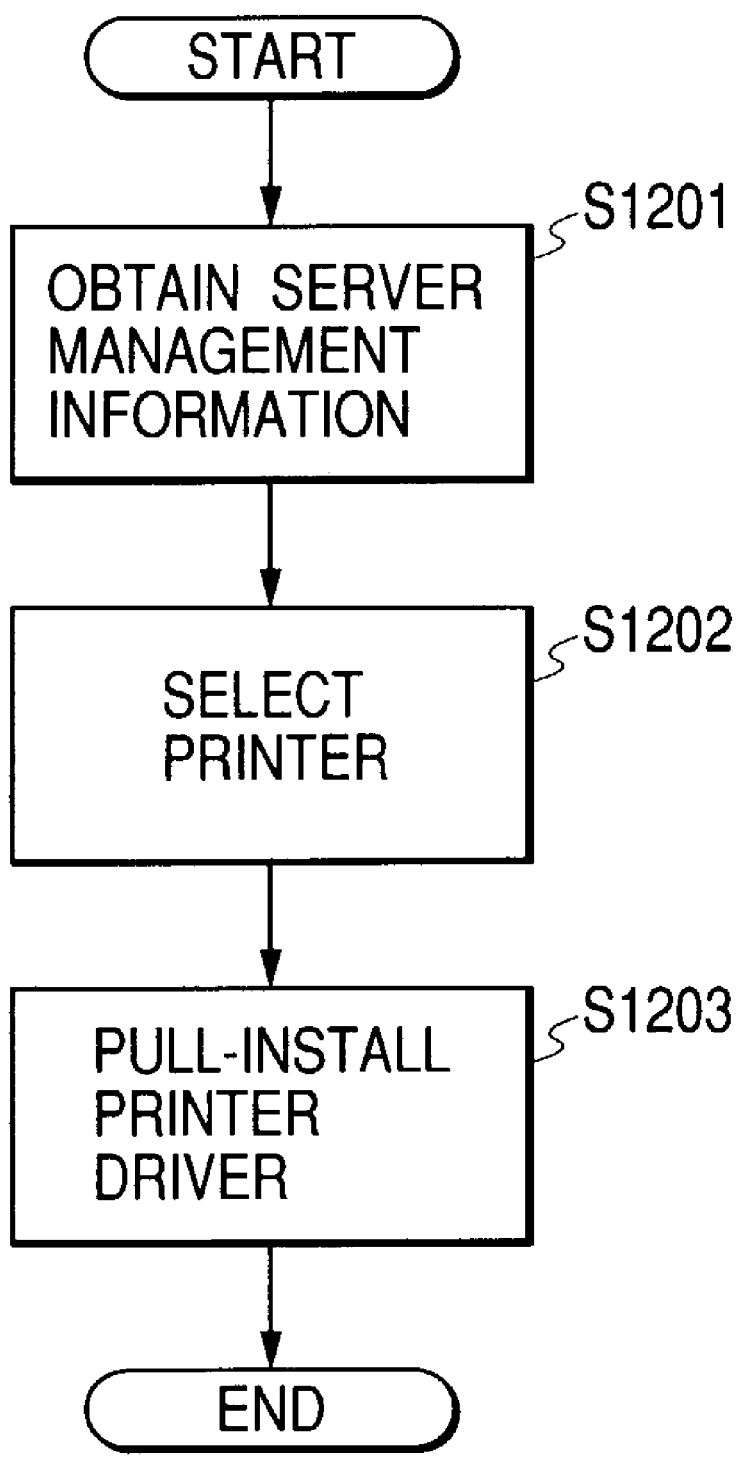
FIG. 12 is a flowchart showing a pull-type installing process in the server in the embodiment.

FIG. 12 is a flowchart showing processes in the client in the embodiment. Processes at the time when the client user makes the pull installation will be described in detail. First, in S1201, the user inquires of the server and obtains the information of the printers which he can use. At this time, the server selects the information of the corresponding client from the management table which is managed by the server and returns it. In the embodiment, it is assumed that such a processing step can be omitted.

If the information is obtained in S1201, the obtained information is subsequently displayed in S1202, thereby also enabling the client to select. An example of a UI (user interface) which is displayed on the client in S1202 is shown in FIG. 13. By selecting the printer into which the user wants to install the driver and clicking the install key on a display screen of FIG. 13, the pull installation is executed (S1203).

Figure 14:
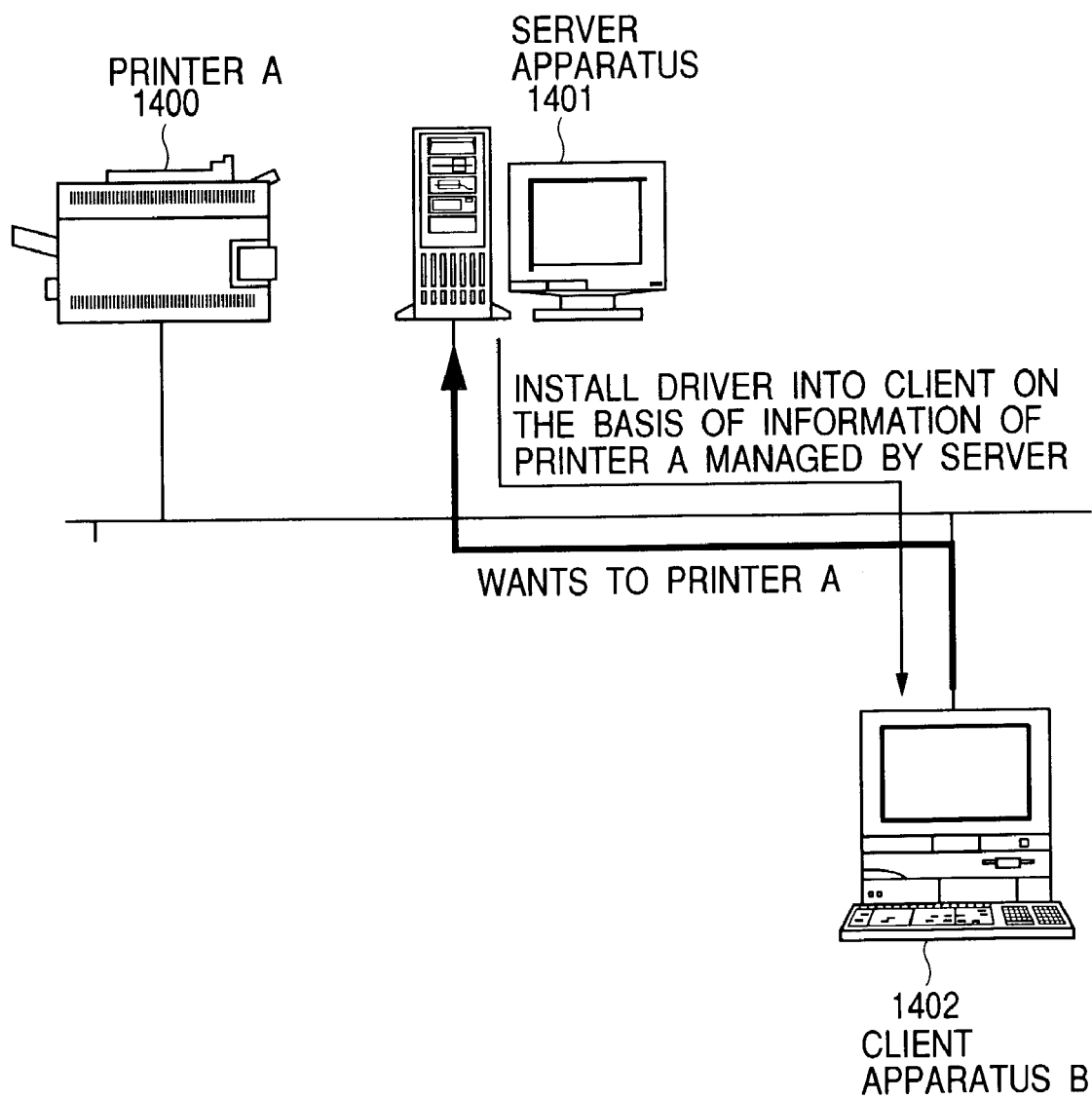
FIG. 14 is a diagram showing a flow for processes according to a pull-installing instruction from the client.

FIG. 14 is a diagram showing a flow for processes according to a pull installing instruction from the client. As shown in FIG. 14, when a pull installing request is issued from the client to the printer management server, the server obtains the information regarding the corresponding client from the management table which is managed by the server, installs the requested printer driver with reference to the printer construction information, and makes the environment setting of an output port and the like together with the installation. FIG. 15 shows an initial set state of the printer driver UI in the case where there is no printer construction information. FIG. 16 shows an initial set state of the printer driver UI in the case where the driver has been installed in accordance with the printer construction information. The pull installation to the client is completed in a form such that the constructing state of the present printer has been reflected as mentioned above.

Third Embodiment

The above embodiment has been described with respect to the pull-type installation. A push-type installation will be described hereinbelow. Particularly, different portions will be mainly explained. In the above embodiment, the example in which the installation is instructed to the driver installer on the client apparatus 1003 side and the printer serving as an installation target is selected and the driver is installed therein on the client apparatus side has been considered. In the third embodiment, in the server apparatus, the installing instruction is transmitted to the client apparatuses 1003, 1004, and 3000. The program as shown in FIG. 3A has been stored in the server apparatus 1002. Reference numeral 301 denotes an application; 302 an empty memory; 304 an installing process related program; 305 an OS; and 306 a BIOS program. The program 304 is a module including a function similar to that of the program 314 and the client management program. On the server side, each client is searched and recognized, the printers which can be used in each client are recognized, a management table of FIG. 11 is displayed on the server side, and the set information based on the input to the management table is formed in a manner similar to the foregoing embodiment.

Figure 10:
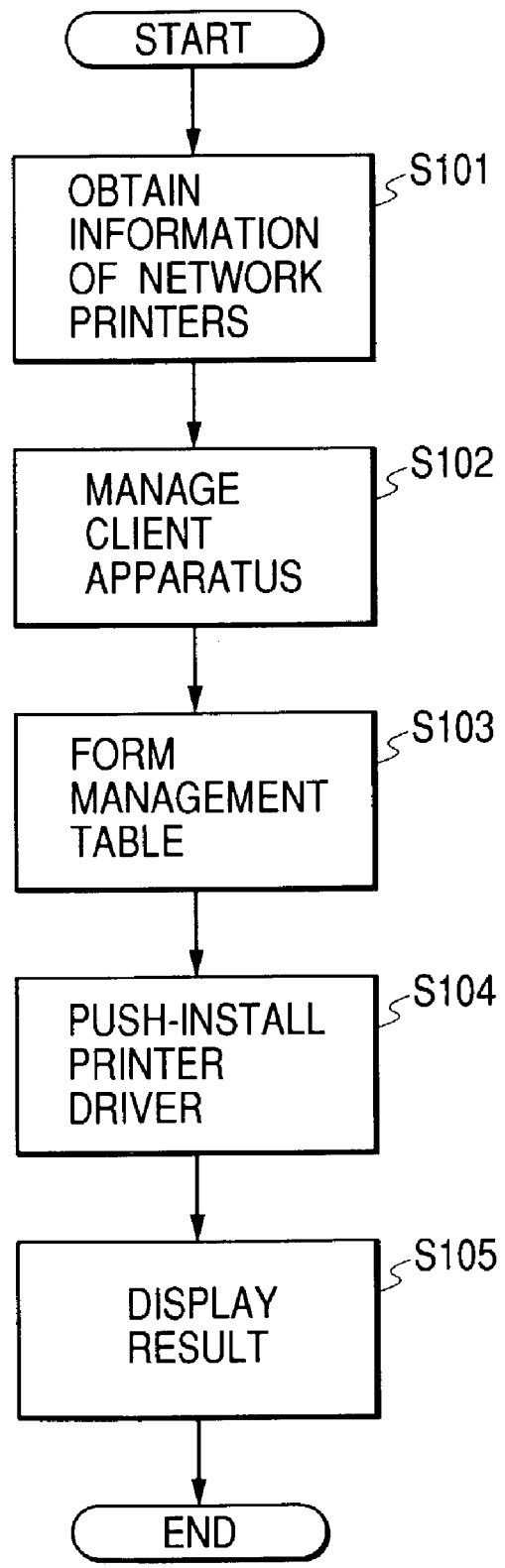
FIG. 10 is a flowchart showing a push-type installing process in the server in the embodiment.

FIG. 10 is a flowchart showing a push-type installing process in the server in the embodiment. The printer information is collected by the construction information obtaining module (S101). After that, the information of the client apparatuses is collected by the client management program and the construction information of the printers and the client information are managed on the server (S102). An example of a management table formed on the basis of those information is similar to that of FIG. 11. By using such a management table, the IT manager manages the printers which each client has been permitted to use.

First, if the existing management table exists, its contents (that is, the present setting of each client) are read out and displayed here. When an arbitrary client is selected in Clients: column, the printers which the client has been permitted to use are displayed in a form with a check mark in the list of Printers: column. By changing the client in Clients: column, the user can see the list of the printers which can be used by each client. Since nothing is allocated at the time of the first setting, to which client the installation of which printer is permitted is set from the initial setting state. A client serving as a management target can be also added from this UI. A situation in which the client B has been selected and the printers A and B have been checked in a printer display unit 1102 as printers which can be used in the client B is shown here.

Subsequently, the push installation is made by clicking an install button (1101) in S104. Specifically speaking, an installing instruction waiting service is permanently stationed at the client apparatus side. When the waiting service recognizes the set-up instruction received on the server apparatus side, a driver installing service (installation control means) is called in a format of a remote procedure call such as SOAP or the like in response to it. The driver installing service called on the client side installs the printer drivers which are managed by the server to each client in a lump in accordance with the management table based on the information input on the display screen of FIG. 11, and the environment setting such as an output port or the like is also made together with it.

For example, when the installing instruction is issued from the server apparatus 1002 side, the waiting service on the client side calls the driver installing service on the client apparatus 3000 side. Further, the client management program on the server side sends the driver serving as an installation target and the set contents set by the management table to the service activated on the client side. The driver installing service to which the driver has been sent automatically executes the installing process in accordance with the set information set by the management table and transmits a return value showing whether the installing process has normally been finished or not to the server apparatus. For example, in the state of FIG. 11, first, the installing service in the client B is activated on the server apparatus side. The drivers of the printers A and B which have been prepared in the server are sent to the installing service. The installing service receives those drivers and automatically installs them.

Subsequently, in S105 in FIG. 10, a result is displayed on the basis of the return value from the driver installing service. Information showing that the driver has been updated is displayed to the client user or information indicative of the end of the updating or its failure is displayed to the server. There is a case where the installation fails if the client is not connected to the network or during the printing. However, by receiving the information of the failure as a return value from the installing service on the client side, the server can use it as a discrimination material in order to take a proper countermeasure such that the IT manager executes a process later or the server apparatus retries after the elapse of a predetermined time.

Although an example of correspondence per client has been shown on the operation display screen, a plurality of clients can be also collectively (for example, on a station or floor unit basis) updated.

As described above, according to the third embodiment, merely by instructing the installation on the server side, the driver is automatically installed on the client side and the construction information of the actual printers is obtained and the values of the set items of the printer function of the driver UI can be conformably and automatically set in accordance with the function of the printer. That is, when the installation of the driver is finished, the client side is in the optimum setting state where the function of the driver is soon used and the function of the option of the printer can be utilized. Naturally, the target which can be conformably set is not limited to the paper feed option but also the initial values of the driver on the client side can be automatically and conformably set so as to accord with the function of the actual apparatus by using all of the information describing that the installation construction information can be obtained in the foregoing embodiment. Since the IT manager can instruct in a lump on the server side and the processes up to the automatic setting of the initial values of the driver can be automatically executed in accordance with the functions of the printer which is used by the driver, it is unnecessary that he visits each client and makes the setting or the like after completion of the installation, or the like. Troublesomeness for installation is remarkably reduced.

Other Embodiments

The processes shown in FIGS. 4 and 12 in the embodiment are executed by each of the client apparatuses 3000, 1003, and 1004 or the like in accordance with programs which are installed from the outside. The processes shown in FIGS. 9 and 10 are executed in the server apparatus. In this case, the invention is also applied to the case where an information group including the programs is supplied to the host computer from a memory medium such as a CD-ROM, a flash memory, an FD, or the like or from an external memory medium via the network.

Naturally, the object of the invention is accomplished by a method whereby a memory medium in which program codes of software to realize the functions of the foregoing embodiments as mentioned above have been recorded is supplied to a system or an apparatus or such program codes are downloaded from an external server (not shown) and a computer (or a CPU or an MPU) of the system or the apparatus reads out the program codes stored in the memory medium and executes them.

In such a case, the program codes themselves read out from the memory medium realize the novel functions of the invention and the memory medium in which the program codes have been stored constructs the invention. As a memory medium for supplying the program codes, for example, a floppy disk, a hard disk, an optical disk, a magnetooptic disk, a DVD, a CD-ROM, a magnetic tape, a non-volatile memory card, a ROM, an EEPROM, or the like can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes, and the functions of the embodiments mentioned above are realized by those processes. Further, naturally, the invention incorporates a case where the program codes read out from the memory medium are written into a memory provided for a function expanding board inserted into a computer or a function expanding unit connected to a computer and, after that, a CPU or the like provided for the function expanding board or the function expanding unit executes a part or all of actual processes on the basis of instructions of the program codes, and the functions of the embodiments mentioned above are realized by those processes.

Although the driver installer has recognized the installation of the driver on the basis of the driver installing instruction in each of the foregoing embodiments, for example, naturally, it is also possible to use a construction such that the installation of the driver is recognized by recognizing the storage of the driver into a predetermined storing area, and the construction information obtaining module is activated in response to it. Further, it is also possible to use a construction such that irrespective of the push-type or the pull-type, for example, by monitoring the return value which is returned by the driver installer or the installing service and recognizing that the return value indicates the completion of the driver installing process, the installation of the driver is recognized, the construction information obtaining module is activated, and a driver configurating process is automatically executed.

As described above, according to the embodiments, for example, the client user merely issues the set-up instruction of the driver installation or selects a printer or driver which he wants to use from the printers or drivers managed by the server and issues the request, so that the installation of the driver into his own client apparatus, its environment setting, and the setting of constructing conditions of the printer are automatically made. Consequently, an effect such that the user does not need any special knowledge or complicated operation is obtained.

What is claimed is:

1. An information processing apparatus that communicates with an image forming apparatus, said information processing apparatus comprising:
recognizing means for making a recognition that a driver program for an image forming process is to be installed into said information processing apparatus;
searching means for searching for an image forming apparatus on the network;
obtaining means for obtaining construction information from the image forming apparatus searched by said searching means via the network in response to the recognition made by said recognizing means, wherein the construction information is related to an optional unit connected to the image forming apparatus, and wherein said obtaining means obtains the construction information using a construction information obtaining program which is activated upon driver program installation;
setting means for setting the construction information obtained by said obtaining means to the driver program so that it can be read by the driver program; and
display control means for controlling a process to display a setting display screen for displaying the setting for the driver program,
wherein said display control means controls the display of the setting display screen to automatically set a setting value related to the optional unit connected to the image forming apparatus obtained by said obtaining means on the setting display screen in accordance with the construction information,
said obtaining means obtains the construction information using Simple Network Management Protocol,
the apparatus further comprises (a) a memory and (b) converting means for converting the construction information in the Management Information Base format into DEVMODE format, and
the construction information is set into a predetermined memory area in the memory in the DEVMODE format by a printer driver calling an application programming interface of an operating system.

2. The apparatus according to claim 1, wherein said setting means sets the construction information obtained by said obtaining means into a predetermined storing area of an operating system serving as an environment in which the driver program operates in a manner such that the driver program can read out the construction information.

3. The apparatus according to claim 1, wherein said recognizing means recognizes the activation of the installed driver program, thereby recognizing the installation of the driver program.

4. The apparatus according to claim 1, further comprising:
input means for receiving an input of a set-up instruction of the driver program from the outside; and
installation control means for controlling an installing process of the driver program which is activated in response to the input of the set-up instruction into said input means,
wherein said recognizing means recognizes that said installation control means has been activated in response to the set-up instruction, thereby recognizing the installation of the driver program.

5. The apparatus according to claim 4, wherein the installation of the driver program is recognized by recognizing the set-up instruction input to said input means.

6. The apparatus according to claim 1, wherein the construction information is information showing a size of random access memory mounted in a printing apparatus, a type of font, the presence or absence of attachment of a sorting apparatus, the presence or absence of a stapling function, or the presence or absence of attachment of an option paper feed cassette.

7. The apparatus according to claim 1, wherein said obtaining means obtains the construction information via an external information processing apparatus and obtains the construction information in response to a printer connected to a network being searched by the external information processing apparatus.

8. An information processing apparatus according to claim 1, wherein said obtaining means obtains construction information related to a paper feeding unit connected to the image forming apparatus,
wherein the setting display screen is a user interface of a printer driver, and
wherein said display control means controls such that a setting value related to the paper feeding unit is set on the user interface of the printer driver.

9. An information processing apparatus according to claim 1, wherein said obtaining means obtains construction information related to a size of a RAM or HDD connected to the image forming apparatus,
wherein the setting display screen is a user interface of a printer driver, and
wherein said display control means controls such that a setting value related to the size of the RAM or HDD is set on the user interface of the printer driver.

10. An information processing method in an information processing apparatus that communicates with an image forming apparatus, said image processing method comprising:
   a recognizing step of making a recognition that a driver program for an image forming process is to be installed into the information processing apparatus;
   a searching step of searching for an image forming apparatus on the network;
   an obtaining step of obtaining construction information from the image forming apparatus searched by said searching step via the network in response to the recognition made by said recognizing step, wherein the construction information is related to an optional unit connected to the image forming apparatus, and wherein said obtaining step obtains the construction information using a construction information obtaining program which is activated upon driver program installation;
   a setting step of setting the construction information obtained by said obtaining step to the driver program so that it can be read by the driver program; and
   a display control step for controlling a process to display a setting display screen for displaying the setting for the driver program,
   wherein said display control step controls the display of the setting display screen to automatically set a setting value related to the optional unit connected to the image forming apparatus obtained by said obtaining step on the setting display screen in accordance with the construction information,
   said obtaining step obtains the construction information using Simple Network Management Protocol,
   the method further comprises a converting step of converting the construction information in the Management Information Base format into DEVMODE format, and
   the construction information is set into a predetermined memory area in the DEVMODE format by a printer driver calling an application programming interface of an operating system.

11. The method according to claim 10, wherein in said setting step, the construction information obtained by said obtaining step is set into a predetermined storing area of an operating system serving as an environment in which the driver program operates in a manner such that the driver program can read out the construction information.

12. The method according to claim 10, wherein in said recognizing step, by recognizing the activation of the installed driver program, the installation of the driver program is recognized.

13. The method according to claim 10, further comprising:
   an input step of receiving an input of a set-up instruction of the driver program from the outside; and
   an installation control step of controlling an installing process of the driver program which is activated in response to the input of the set-up instruction in said input step,
   wherein in said recognizing step, by recognizing that said installation control step has been activated in response to the set-up instruction, the installation of the driver program is recognized.

14. The method according to claim 13, wherein the installation of the driver program is recognized by recognizing the set-up instruction input by said input step.

15. The method according to claim 10, wherein the construction information is information showing a size of random access memory mounted in a printing apparatus, a type of font, the presence or absence of attachment of a sorting apparatus, the presence or absence of a stapling function, or the presence or absence of attachment of an option paper feed cassette.

16. The method according to claim 10, wherein in said obtaining step, the construction information is obtained via an external information processing apparatus and the construction information is obtained in response to a printer connected to a network being searched by the external information processing apparatus.

17. An information processing method according to claim 10, wherein said obtaining step obtains construction information related to a paper feeding unit connected to the image forming apparatus,
   wherein the setting display screen is a user interface of a printer driver, and
   wherein said display control step controls such that a setting value related to the paper feeding unit is set on the user interface of the printer driver.

18. An information processing method according to claim 10, wherein said obtaining step obtains construction information related to a size of a RAM or HDD connected to the image forming apparatus,
   wherein the setting display screen is a user interface of a printer driver, and
   wherein said display control step controls such that a setting value related to the size of the RAM or HDD is set on the user interface of the printer driver.

19. A computer-readable memory medium which stores a control program that is executed in an information processing apparatus which communicates with an image forming apparatus, wherein said control program allows a CPU (Central Processing Unit) to execute:
   a recognizing step of making a recognition that a driver program for an image forming process is to be installed into said information processing apparatus;
   a searching step of searching for an image forming apparatus on the network;
   an obtaining step of obtaining construction information from the image forming apparatus searched by said searching step via the network in response to the recognition made by said recognizing step, wherein the construction information is related to an optional unit connected to the image forming apparatus, and wherein said obtaining step obtains the construction information using a construction information obtaining program which is activated upon driver program installation;
   a setting step of setting the construction information obtained by said obtaining step to the driver program so that it can be read by the driver program; and
   a display control step for controlling a process to display a setting display screen for displaying the setting for the driver program,
   wherein said display control step controls the display of the setting display screen to automatically set a setting value related to the optional unit connected to the image forming apparatus obtained by said obtaining step on the setting display screen in accordance with the construction information,
   said obtaining step obtains the construction information using Simple Network Management Protocol,
   the method further comprises a converting step of converting the construction information in the Management Information Base format into DEVMODE format, and
   the construction information is set into a predetermined memory area in the DEVMODE format by a printer driver calling an application programming interface of an operating system.

* * * * *

UNITED STATES PATENT AND TRADEMARK OFFICE
CERTIFICATE OF CORRECTION

PATENT NO. : 7,383,554 B2
APPLICATION NO. : 10/459502
DATED : June 3, 2008
INVENTOR(S) : Hiroshi Ozaki et al.

It is certified that error appears in the above-identified patent and that said Letters Patent is hereby corrected as shown below:

COLUMN 4
Line 10, "execute" should read --executes--.

COLUMN 5
Line 15, "hereinlater" should read --hereinafter--.

COLUMN 7
Line 25, "obtained" should read --is obtained--.

COLUMN 8
Line 55, "those" should read --these--.

COLUMN 9
Line 23, "those" should read --these--.
Line 30, "Those" should read --This--.
Line 42, "those" should read --these--.
Line 57, "those" should read --these--.

COLUMN 11
Line 8, "those" should read --these--.

Signed and Sealed this

Eleventh Day of November, 2008

JON W. DUDAS
*Director of the United States Patent and Trademark Office*